US007067578B2

(12) United States Patent
Massillon

(10) Patent No.: US 7,067,578 B2
(45) Date of Patent: Jun. 27, 2006

(54) METHOD FOR PREPARING LATEX

(75) Inventor: Henri Massillon, Waremme (BE)

(73) Assignee: Solvay (Societe Anonyme), Brussels (BE)

( * ) Notice: Subject to any disclaimer, the term of this patent is extended or adjusted under 35 U.S.C. 154(b) by 0 days.

(21) Appl. No.: 10/450,533

(22) PCT Filed: Dec. 20, 2001

(86) PCT No.: PCT/EP01/15381

§ 371 (c)(1),
(2), (4) Date: Dec. 1, 2003

(87) PCT Pub. No.: WO02/50140

PCT Pub. Date: Jun. 27, 2002

(65) Prior Publication Data

US 2004/0077765 A1    Apr. 22, 2004

(30) Foreign Application Priority Data

Dec. 21, 2000  (FR) .................................. 00 17073

(51) Int. Cl.
*C08F 2/08*      (2006.01)
*C08F 2/38*      (2006.01)
*C08F 14/06*     (2006.01)
*C08F 291/00*    (2006.01)
*C08F 291/04*    (2006.01)

(52) U.S. Cl. ...................... 524/458; 526/201; 526/216; 526/344.2

(58) Field of Classification Search ................ 524/458; 526/201, 216, 344.2
See application file for complete search history.

(56) References Cited

U.S. PATENT DOCUMENTS

| | | | |
|---|---|---|---|
| 3,725,367 A | | 4/1973 | Kemp |
| 3,935,151 A | * | 1/1976 | Nickerson et al. ........... 524/501 |
| 4,168,373 A | * | 9/1979 | Nickerson et al. ........... 523/328 |
| 4,245,070 A | | 1/1981 | Kemp |
| 4,327,003 A | * | 4/1982 | Hao et al. .................... 523/336 |
| 4,451,614 A | * | 5/1984 | Flatau .......................... 525/80 |
| 4,629,772 A | * | 12/1986 | Odd ............................ 526/201 |
| 4,654,392 A | * | 3/1987 | Marshall ....................... 526/84 |
| 5,169,918 A | | 12/1992 | Tomishima et al. ....... 526/344.2 |
| 5,300,551 A | * | 4/1994 | Candries et al. ............. 524/458 |
| 6,046,286 A | * | 4/2000 | Kreilein et al. ................ 526/88 |
| 6,277,954 B1 | * | 8/2001 | Makino et al. ............. 528/501 |

FOREIGN PATENT DOCUMENTS

| | | | |
|---|---|---|---|
| DE | 152347 B | * | 7/1987 |
| EP | 0 810 241 | | 12/1997 |
| JP | 10316704 | * | 12/1998 |

* cited by examiner

*Primary Examiner*—Kelechi C. Egwim
(74) *Attorney, Agent, or Firm*—Oblon, Spivak, McClelland, Maier & Neustadt, P.C.

(57) ABSTRACT

Process for the preparation of latices by batchwise radical polymerization of one or more monomers, comprising the participation, in the polymerization, of: (a) one or more fine dispersions of one or more finely dispersed monomers and (b) one or more seed latices of one or more seeding polymers.

23 Claims, No Drawings

METHOD FOR PREPARING LATEX

The present invention relates to a process for the preparation of latices by batchwise radical polymerization of one or more monomers.

Several processes for the preparation of latices by batchwise radical polymerization are known to a person skilled in the art.

First of all, it is known to prepare latices by batchwise radical polymerization in non-micellar emulsion with the participation of a water-soluble initiator, optionally with the participation of a seed latex. This process for the preparation of latices is such that the compositions and the articles prepared from the latices or resins obtained by drying the latter and then by milling the dry products have poor properties, in particular a low thermal stability and a pronounced starting coloration. In addition, if the emulsion polymerizations are carried out without seed latex:

elementary particles are created during the polymerization according to very complex mechanisms which are difficult to control the elementary particles of the polymer(s) thus prepared are all small in size; the latices comprising such elementary polymer particles and the plastisol compositions comprising the polymer resins prepared by drying such latices and then by milling the dry products have a very high viscosity.

In addition, if non-micellar emulsion polymerizations are carried out with the participation of a seed latex;

elementary particles are nevertheless generally created during the polymerization, with the abovementioned disadvantages ipso facto, it is necessary to prepare the said seed latex; in point of fact, the preparation of appropriate seed latices is complex in itself.

Subsequently, it is known to prepare latices by batchwise radical microsuspension polymerization with the participation of oil-soluble initiator(s) included in a fine monomer dispersion. This process for the preparation of latices is such that the compositions and articles prepared from the latices or from the resins obtained by drying the latter and by then milling the dry products have, taken as a whole, better properties than the compositions and articles prepared from the latices and resins obtained by processes for the preparation of latices according to which the latices are prepared by batchwise radical emulsion polymerization, as described above. However, this process for the preparation of latices has a major disadvantage: this process is such that the latices prepared according to it have a poor mechanical stability; in order to improve the mechanical stability of such latices, it is necessary to reduce the amount of monomer(s) employed in the polymerization, leading to low productivity.

Finally, U.S. Pat. No. 4,245,070 discloses a process for the preparation of latices of a vinyl chloride polymer by batchwise radical "special microsuspension" polymerization with the participation of a seed latex comprising an oil-soluble initiator (hereinafter denoted LB*), of one or more seed latices not comprising initiator and, also, preferably, with the participation of a complex activating agent. According to this process for the preparation of latices, no fine monomer dispersion is introduced into the polymerization medium. This process for the preparation of latices has numerous disadvantages:

this process employs, in the polymerization, a seed latex LB* which is extremely difficult to prepare, store and handle: (a) with regard to the preparation of LB*: the removal of the residual LB* monomer has to be carried out under mild conditions, so as not to destroy the undecomposed initiators; (b) with regard to the storage and handling of LB*: very specific precautions are needed, in particular the maintenance of a sufficiently low storage temperature and the absence of contact with the atmosphere this process, when it employs an activating agent under the form of a complex in the polymerization, is usually such that the compositions and articles prepared from the latices or from the resins obtained by drying the latter have poor properties, in particular a low thermal stability and a pronounced initial coloration this process, when it does not employ, in the polymerization, an activating agent under the form of a complex plus the LB* latex in a high amount, is such that the duration of the polymerization is extremely long (18 hours, according, to Example 1 of the patent).

A subject-matter of the present invention is a process for the preparation of latices by batchwise radical polymerization of one or more monomers which makes it possible simultaneously to benefit from all the advantages of the processes of the prior art and to avoid all the disadvantages thereof.

To this end, the invention relates to a process for the preparation of latices by batchwise radical polymerization of one or more monomers, characterized in that it involves, in the polymerization:

(a) one or more fine dispersions comprising one or more finely dispersed monomers and (b) one or more seed latices comprising one or more seeding polymers.

The process for the preparation of latices according to the invention in addition optionally involves, in the polymerization, in particular one or more substances as such and/or one or more solutions of one or more substances and/or one or more dispersions of one or more substances, which substances can be chosen, independently of one another, in particular from: monomers, liquid dispersants, oil-soluble initiators, water-soluble initiators, ionic emulsifiers, non-ionic emulsifiers, mechanical stabilizers, reducing agents, complexing agents, catalysts, peak suppressants, pH-fixing agents, chain-extending agents and transfer agents.

In particular, the process for the preparation of latices according to the invention in addition optionally involves one or more substances as such and/or one or more solutions chosen from:

monomers as such liquid dispersants as such solutions comprising one or more water-soluble initiators solutions comprising one or more ionic emulsifiers solutions comprising one or more reducing agents.

The fine dispersion or dispersions, the seed latex or latices, the substance or substances as such, the solution or solutions and the dispersion or dispersions can be introduced into the reactor (or, optionally, in the case of fine dispersions and of seed latices, prepared directly in the latter), independently of one another, before the polymerization begins or while the polymerization is taking place, optionally at separate times and according to separate introduction programs.

The number of fine dispersions is usually equivalent to at most the number of finely dispersed monomers and preferably to 1.

The fine dispersion or dispersions usually comprise at least:

one or more finely dispersed monomers one or more liquid dispersants for these monomers.

One or more fine dispersions optionally comprise, in addition and independently of one another: one or more oil-soluble initiators, one or more water-soluble initiators, one or more ionic emulsifiers, one or more nonionic emulsifiers, one or more mechanical stabilizers, one or more reducing agents, one or more complexing agents, one or more catalysts, one or more peak suppressants, one or more pH-fixing agents, one or more chain-extending agents, one or more transfer agents, and one or more polymers.

Usually at least one and preferably all the fine dispersions comprise one or more oil-soluble initiators.

Usually, no fine dispersion comprises a water-soluble initiator.

Usually at least one and preferably all the fine dispersions comprise one or more ionic emulsifiers.

Usually, no fine dispersion comprises a polymer.

The fine dispersion or dispersions can be prepared by any known means. The fine dispersion or dispersions are usually prepared by means of a size-reduction equipment, such as, for example, a high-pressure homogenizer, a colloid mill, a fast pump, a vibratory agitator or an ultrasound device. The fine dispersion or dispersions are preferably prepared by means of a high-pressure homogenizer or colloid mill and in a particularly preferred way by means of a high-pressure homogenizer.

The fine dispersion or dispersions are usually, independently of one another and independently of the seed latices, either prepared outside the polymerization reactor and then introduced into the latter, or prepared directly inside the latter. It is also possible in particular to prepare one or more fine dispersions outside the reactor and then to introduce these into one or more seed latices or into one or more substances as such, which are introduced in their turn into the polymerization reactor. The fine dispersion or dispersions are preferably prepared outside the polymerization reactor and are then introduced into the latter.

The fine dispersion or dispersions introduced into the reactor or prepared directly in the latter are usually introduced or prepared respectively, independently of one another and independently of the seed latices, before the polymerization begins or while the polymerization is taking place, optionally at separate times and according to separate introduction programs. The fine dispersion or dispersions introduced into the reactor or prepared directly in the latter are preferably introduced or prepared respectively before the polymerization begins.

The number of seed latices is usually equivalent to at most the number of seeding polymers and preferably to 1.

The seed latex or latices usually comprise at least:
one or more seeding polymers
one or more liquid dispersants for these polymers.

One or more seed latices optionally comprise, in addition and independently of one another: one or more oil-soluble initiators, one or more water-soluble initiators, one or more ionic emulsifiers, one or more nonionic emulsifiers, one or more mechanical stabilizers, one or more reducing agents, one or more complexing agents, one or more catalysts, one or more peak suppressants, one or more pH-fixing agents, one or more chain-extending agents, one or more transfer agents, and one or more monomers.

Usually, at most one seed latex comprises one or more oil-soluble initiators; preferably, no seed latex comprises an oil-soluble initiator.

Usually no seed latex comprises a water-soluble initiator added after the preparation of the seed latex.

Usually at least one and preferably all the seed latices comprise one or more ionic emulsifiers.

Usually, no seed latex comprises a monomer.

The seed latex or latices can be prepared by any known process for the preparation of latices, in particular by seeded or unseeded, micellar or non-micellar, aqueous emulsion polymerization processes and seeded or unseeded, aqueous microsuspension polymerization processes; the seed latex or latices can also be prepared by the process for the preparation of latices according to the invention, The seed latex or latices are usually prepared by an unseeded aqueous emulsion polymerization process; preferably by an unseeded aqueous emulsion polymerization process according to which at least one ionic emulsifier is introduced into the polymerization medium before the polymerization begins; in a particularly preferred way, by an unseeded aqueous emulsion polymerization process according to which at least one ionic emulsifier is introduced into the polymerization medium before the polymerization begins at a concentration, with respect to the water, equivalent to at least ½ the critical micelle concentration of this ionic emulsifier in water. seed latex or latices are usually, independently of one another and independently of the fine dispersions, either prepared outside the polymerization reactor and then introduced into the latter, or prepared directly inside the latter. It is also possible in particular to prepare one or more seed latices outside the reactor and then to introduce these either into one or more fine dispersions or into one or more substances as such, which are introduced in their turn into the polymerization reactor, or alternatively into one or more preparatory mixtures for one or more fine dispersions which have not yet been formed, which are then subjected to the usual size-reduction operations (for example, by means of a homogenizer) and then introduced into the reactor. The seed latex or latices are preferably prepared outside the polymerization reactor and then introduced into the latter.

The seed latex or latices introduced into the polymerization reactor or prepared directly in the latter are usually introduced or prepared respectively, independently of one another and independently of the fine dispersions, before the polymerization begins or while the polymerization is taking place, optionally at separate times and according to separate introduction programs. The seed latex or latices introduced into the polymerization reactor or prepared directly in the latter are preferably introduced or prepared respectively before the polymerization begins.

The number of monomers participating as such in the polymerization can take any value; in particular, this number can have the value 0. The number of monomers participating as such in the polymerization is preferably equivalent to at least the number of finely dispersed monomers and in a particularly preferred way is equivalent to the number of finely dispersed monomers.

The number of liquid dispersants participating as such in the polymerization can have any value; in particular, this number can have a value of 0. The number of liquid dispersants participating as such in the polymerization is preferably equivalent to at least the number of liquid-dispersants for the finely dispersed monomers and in a particularly preferred way is equivalent to the number of liquid dispersants for the finely dispersed monomers.

The number of solutions comprising one or more water-soluble initiators usually has a value equivalent to at most 1; preferably this member has a value of 0.

The solution or solutions comprising one or more water-soluble initiators usually comprise:
one or more water-soluble initiators
one or more solvents for these initiators.

The number of solutions comprising one or more ionic emulsifiers is usually equivalent to at least the number of ionic emulsifiers included in the fine dispersions and is preferably equivalent to the number of ionic emulsifiers included in the fine dispersions.

The solution or solutions comprising one or more ionic emulsifiers usually comprise:
one or more ionic emulsifiers
one or more solvents for these ionic emulsifiers.

The number of solutions comprising one or more reducing agents is usually equivalent to at most 1; preferably, this number has a value of 0.

The solution or solutions comprising one or more reducing agents usually comprise:
one or more water-soluble reducing agents
one or more solvents for these reducing agents.

The monomer or monomers are usually chosen from ethylenically unsaturated monomers.

Preferably, at least 50% by weight, in a particularly preferred way at least 80% by weight and in a very particularly preferred way all of the monomers are chosen from halogenated vinyl monomers.

In addition, if one or more monomers are chosen from halogenated vinyl monomers, the monomer or monomers other than the halogenated vinyl monomer or monomers are preferably chosen from vinyl esters, in particular vinyl acetate, and from acrylic esters and methacrylic esters.

The halogenated vinyl monomer or monomers are usually chosen from chlorine-comprising halogenated vinyl monomers and, preferably, the halogenated vinyl monomer is vinyl chloride.

The monomer or monomers are usually:
the finely dispersed monomer or monomers
the monomer or monomers participating as such in the polymerization, denoted "monomers as such".

The finely dispersed monomer or monomers have a usually very broad distribution of their droplets; the range of the distribution of the droplets preferably has a value from a few hundredths of a micron to a few microns and in a particularly preferred way from a few tenths of a micron to a few microns.

In addition, the finely dispersed monomer or monomers preferably have a unimodal distribution of their droplets.

The weight of the finely dispersed monomer or monomers with respect to the total weight of the monomer or monomers is usually equivalent to at least it, preferably to at least 5%, in a particularly preferred way to at least 10% and in a very particularly preferred way to at least 15%.

The weight of the finely dispersed monomer or monomers with respect to the total weight of the monomer or monomers is usually equivalent to at most 100%; it is preferably equivalent to at most 75% and in a particularly preferred way to at most 50%.

The weight of the monomer or monomers as such is usually equivalent to the total weight of the monomer or monomers less the weight of the finely dispersed monomer or monomers.

The weight of the monomer or monomers as such introduced into the polymerization reactor while the polymerization is taking place, with respect to the total weight of the monomer or monomers, is usually equivalent to at least 15%.

The seeding polymer or polymers are usually polymers prepared by radical polymerization of one or more ethylenically unsaturated monomers.

Usually, at least 50% by weight, preferably at least 80% by weight and in a particularly preferred way all of the seeding polymers are chosen from halogenated vinyl polymers.

The halogenated vinyl polymer or polymers are usually chosen from chlorine-comprising halogenated vinyl polymers, preferably from vinyl chloride polymers comprising at least 80% by weight of —$CH_2$—CHCl— units and in a particularly preferred way from vinyl chloride homopolymers.

The seeding polymer or polymers can have a distribution of their elementary particles of any type.

The seeding polymer or polymers have a distribution of their elementary particles such that at least 50% by weight of the latter have a diameter usually of less than 400 nm, preferably of less than 300 nm, in a particularly preferred way of less than 200 nm and in a very particularly preferred way of less than 130 nm.

In addition, the seeding polymer or polymers have a distribution of their elementary particles such that at least 50% by weight of the latter have a diameter usually of greater than 25 nm, preferably of greater than 40 nm, in a particularly preferred way of greater than 55 nm and in a very particularly preferred way of greater than 70 nm.

In addition; the seeding polymer or polymers have a distribution of their elementary particles for which the number of families is usually equivalent to at most the number of seed latices plus 1, preferably is equivalent to at most the number of seed latices and in a particularly preferred way has a value of 1.

In addition, the seeding polymer or polymers have a distribution of their elementary particles for which usually at least one and preferably each family has a weight-average diameter usually with a value of at most 300 nm, preferably of at most 200 nm, and in a particularly preferred way of at most 130 nm.

In addition, the seeding polymer or polymers have a distribution of their elementary particles for which usually at least one and preferably each family has a weight-average diameter usually with a value of at least 40 nm, preferably of at least 55 nm, and in a particularly preferred way of at least 70 nm.

The weight of the seeding polymer or polymers with respect to the total weight of the monomer or monomers usually has a value of at least 1%, preferably of least 2% and in a particularly preferred way of at least 3%.

The weight of the seeding polymer or polymers with respect to the total weight of the monomer or monomers usually has a value of at most 25%, preferably of at most 15% and in a particularly preferred way of at most 10%.

The liquid dispersant or dispersants and the solvent or solvents are usually chosen from water and alcohols having a molecular weight of less than 80.

Preferably, at least 50% by weight, in a particularly preferred way at least 80% by weight and in a very particularly preferred way all of the liquid dispersants and solvents are water.

The liquid dispersant or dispersants are usually:
the liquid dispersant or dispersants for the finely dispersed monomer or monomers
the liquid dispersant or dispersants for the seeding polymer or polymers
the liquid dispersant or dispersants participating as such in the polymerization, denoted "liquid dispersants as such".

The weight of the liquid dispersant or dispersants for the finely dispersed monomer or monomers with respect to the weight of the finely dispersed monomer or monomers usually has a value of at least 1 and preferably of at least 1.2.

The weight of the liquid dispersant or dispersants for the finely dispersed monomer or monomers with respect to the weight of the finely dispersed monomer or monomers usually has a value of at most 2 and preferably of at most 1.5.

The weight of the liquid dispersant or dispersants for the seeding polymer or polymers with respect to the weight of the seeding polymer or polymers usually has a value of at least 1.

The weight of the liquid dispersant or dispersants for the seeding polymer or polymers with respect to the weight of the seeding polymer or polymers usually has a value of at most 2.

The weight of the liquid dispersant or dispersants as such with respect to the weight of the monomer or monomers as such usually has a value of at least 0.2 and preferably of at least 0.4.

The weight of the liquid dispersant or dispersants as such with respect to the weight of the monomer or monomers as such usually has a value of at most 2 and preferably of at most 1.5.

The oil-soluble initiator or initiators are usually oil-soluble organic peroxides or oil-soluble diazo compounds.

The oil-soluble initiator or initiators are preferably chosen from oil-soluble organic peroxides comprising at least 10 carbon atoms and from oil-soluble diazo compounds comprising at least 10 carbon atoms, in a particularly preferred way from oil-soluble organic peroxides comprising at least 20 carbon atoms and in a very particularly preferred way from oil-soluble diacyl peroxides comprising at least 20 carbon atoms and from oil-soluble dialkyl peroxydicarbonates comprising at least 20 carbon atoms.

The oil-soluble initiator or initiators are usually:
the oil-soluble initiator or initiators included in the fine dispersion or dispersions
the oil-soluble initiator or initiators included in the seed latex or latices.

The number of moles of the oil-soluble initiator or initiators included in the fine dispersion or dispersions with respect to the total number of moles of the oil-soluble initiator or initiators usually has a value of at least 50% and preferably of at least 75%. Conversely, the number of moles of the oil-soluble initiator or initiators included in the seed latex or latices with respect to the total number of moles of the oil-soluble initiator or initiators usually has a value of less than 50% and preferably of less than 25%.

The water-soluble initiator or initiators are usually chosen from water-soluble inorganic peroxides, water-soluble organic hydroperoxides and water-soluble diazo compounds. The water-soluble initiator or initiators are preferably chosen from water-soluble persulphates and hydrogen peroxide.

The water-soluble initiator or initiators are usually included in one or more solutions of water-soluble initiator(s).

The total number of moles of the water-soluble initiator or initiators with respect to the total number of moles of the oil-soluble initiator or initiators usually has a value of less than 100% and preferably of less than 50%.

The ionic emulsifier or emulsifiers are all usually chosen either from anionic emulsifiers and amphoteric emulsifiers or from cationic emulsifiers and amphoteric emulsifiers; preferably, all are chosen from anionic emulsifiers; in a particularly preferred way, all are chosen from the following anionic emulsifiers: alkyl sulphates, alkyl sulphonates, alkylaryl sulphonates, dialkyl sulphosuccinates and alkyl carboxylates, which salts can, independently of one another, be optionally ethoxylated and can comprise, independently of one another, as counterion, a sodium, potassium, lithium or ammonium cation. In a very particularly preferred way, all are chosen from the following nonethoxylated sodium salts: alkyl sulphates, alkyl sulphonates, alkylaryl sulphonates, dialkyl sulphosuccinates and alkyl carboxylates.

The ionic emulsifier or emulsifiers are usually:
the ionic emulsifier or emulsifiers included in the fine dispersion or dispersions
the ionic emulsifier or emulsifiers included in the seed latex or latices
the ionic emulsifier or emulsifiers included in the solution or solutions of ionic emulsifier(s).

The weight of the ionic emulsifier or emulsifiers included in the fine dispersion or dispersions with respect to the weight of the finely dispersed monomer or monomers usually has a value of at least 0.5%.

The weight of the ionic emulsifier or emulsifiers included in the fine dispersion or dispersions with respect to the weight of the finely dispersed monomer or monomers usually has a value of at most 3%.

The weight of the ionic emulsifier or emulsifiers included in the seed latex or latices with respect to the weight of the seeding polymer or polymers usually has a value of at least 0.5%.

The weight of the ionic emulsifier or emulsifiers included in the seed latex or latices with respect to the weight of the seeding polymer or polymers usually has a value of at most 3%.

The weight of the ionic mulsifier or emulsifiers included in the solution or solutions of ionic emulsifier(s) with respect to the weight of the monomer or monomers as such usually has a value of at least 0.2% and preferably of at least 0.4%.

The weight of the ionic emulsifier or emulsifiers included in the solution or solutions of ionic emulsifier(s) with respect to the weight of the monomer or monomers as such usually has a value of at most 3% and preferably of at most 1.5%.

The water-soluble reducing agent or agents are usually chosen from ascorbic acid, water-soluble reducing salts of sulphur oxyanions and water-soluble reducing salts of metals of the VB, VIB, VIIB, VIII, IB and IIB groups and preferably from water-soluble reducing salts of sulphur oxyanions.

The water-soluble reducing agent or agents are usually included in one or more solutions of water-soluble reducing agent(s).

The total number of moles of the water-soluble reducing agent or agents with respect to the total number of moles of the oil-soluble initiator or initiators usually has a value of less than 50%.

The preset polymerization temperature usually has a value of at least −50° C., preferably of at least 0° C., in a particularly preferred way of at least 30° C. and in a very particularly preferred way of at least 45° C.

The preset polymerization temperature usually has a value of at most, 250° C., preferably of at most 100° C., in a particularly preferred way of at most 80° C. and in a very particularly preferred way of at most 65° C.

Except for the distinctive features explained above, the amounts of the substances participating in the polymerization and the general conditions of the polymerization in the process according to the invention do not differ from those usually employed in the radical polymerization of monomers, particularly of halogenated vinyl monomers and more particularly of vinyl chloride.

The total amount of monomer(s) converted to a polymer(s) usually has a value of at least 50%, preferably of at least 70% and in a particularly preferred way of at least 80%.

After the polymerization, the latices are usually subjected to purification from the residual monomer or monomers.

After the polymerization, the latices can, in addition, optionally have added thereto one or more substances usually chosen from emulsifiers, heat stabilizers, viscosity-lowering agents, antistatic agents, fillers and pigments.

After the polymerization, the latices can, in addition, optionally be mixed with one or more other latices. Preferably, the latices are not mixed with other latices.

After the polymerization, the latices are usually either used as such or treated so as to recover therefrom the polymer or polymers in the form of resins.

After the polymerization, the latices are preferably treated so as to recover therefrom the polymer or polymers in the form of resins.

The treatment for recovery of the polymer or polymers in the form of resins can be carried out by any known separation process or by their combination; it is preferably carried but by one or the following processes or by a combination thereof:

filtration or ultrafiltration
coagulation
separation by settling
draining
flaking
lyophilization
drying by atomization.

The treatment for recovery of the polymer or polymers in the form of resins is, in a particularly preferred way, carried out by drying by atomization.

The drying by atomization of the latices can be carried out by means of any known type of atomizer-dryer, it is preferably carried out:

either by means of atomizer-dryers equipped with a device for rotating at high speed and pierced by fine orifices from which the latices are expelled into a stream of hot air or by means of atomizer-dryers equipped with one or more nozzles for spraying with one or more fluids; the fluid is the latex, the other optional fluids (usually denoted "spraying fluids") are air, steam or mixtures of air and steam; the fluids are usually sprayed into a stream of hot air.

After the recovery of the polymer or polymers in the form of resins, these resins are usually either used as such or treated so as to adjust the particle size thereof.

After the recovery of the polymer or polymers in the form of resins, these resins are preferably treated so as to adjust the particle size thereof.

The treatment for adjusting the particle size can be carried out by any known process or by their combination, The treatment for adjusting the particle size is preferably carried out by one of the following processes or by a combination thereof:

milling
classification
sieving.

Another subject-matter of the present invention is latices having excellent properties prepared by a particularly efficient process.

To this end, the invention relates to the latices prepared by the process according to the invention.

The polymer or polymers of the latices prepared by the process according to the invention can have any distribution of their elementary particles.

The polymer or polymers of the latices prepared by the process according to the invention have a distribution of their elementary particles such that usually at most 50% and preferably at most 30% by weight of the latter have a diameter of less than 400 nm.

In addition, the polymer or polymers of the latices prepared by the process according to the invention have a distribution of their elementary particles such that usually at least 2%, preferably at least 6% and in a particularly preferred way at least 10% by weight of the latter have a diameter of less than 400 nm.

In addition, the polymer or polymers of the latices prepared by the process according to the invention have a distribution of their elementary particles in which the number of families usually has a value of at least 2.

In addition, the polymer or polymers of the latices prepared by the process according to the invention have a distribution of their elementary particles in which the number of families is usually equivalent to at most the number of seed latices plus 2, preferably to at most the number of seed latices plus 1 and in a particularly preferred way to at most 2.

In addition, the polymer or polymers of the latices prepared by the process according to the invention have a distribution of their elementary particles in which usually at least one and preferably only one family has a weight-average diameter with a value of at least 400 nm.

In addition, the polymer or polymers of the latices prepared by the process according to the invention have a distribution of their elementary particles in which usually at least one and preferably each family except one has a weight-average diameter with a value usually of at most 350 nm, preferably of at most 250 nm and in a particularly preferred way of at most 180 nm, In addition, the polymer or polymers of the latices prepared by the process according to the invention have a distribution of their elementary particles in which usually at least one and preferably each family except one has a weight-average diameter with a value usually of at least 90 nm, preferably of at least 105 nm and in a particularly preferred way of at least 120 nm.

The latex or latices prepared by the process according to the invention are usually either used in the form of latexes, for the preparation in particular of inks or films, or treated so as to recover the polymers therefrom, in particular in the form of resins.

Finally, a subject-matter of the present invention is polymer resins having excellent properties prepared by a particularly efficient process.

To this end, the invention relates to the polymer resins prepared by the process according to the invention.

The polymer resins prepared by the process according to the invention are usually used for the preparation of plasticized or unplasticized polymer compositions in which the polymer(s) is (are) usually either in the powder form, or in the disperse form, or alternatively in the dissolved form (this is in particular the case for compositions formed from "soluble" resins formed from vinylidene chloride polymers for film applications). In particular, the resins formed from vinyl chloride polymers comprising at least 80% by weight of —$CH_2$—CHCl— units according to the invention are usually used for the preparation of plastisol compositions.

The process for the preparation of latices according to the invention has many advantages.

First of all, the process for the preparation of latices according to the invention is particularly productive and economically advantageous:
- it makes possible the preparation of highly concentrated latices (with a dry matter content of greater than 50%) which are outstandingly stable; by way of indication, the productivity is increased by at least 25% with respect to the process for the preparation of latices by batchwise radical microsuspension polymerization, and without additional capital expenditure
- this process is such that it does not require the use in the polymerization of a large amount of seed latex or latices, which then occupies a significant space in the reactor and for this reason affects the productivity of the process.

Next, the process for the preparation of latices according to the invention is particularly simple to implement:
- this process is such that the polymerization does not require the use of seed latex or latices which is (are) difficult to prepare, to handle and to store
- this process is such that the polymerization can usually be carried out with seed latex or latices which is (are) easy to prepare, to handle and to store.

Next, the process for the preparation of latices according to the invention is particularly easy to control and the products, latices and resins, prepared by this process, have remarkably constant characteristics and properties:
- this process is such that no or extremely few particles are created in the polymerization according to complicated mechanisms
- the latex prepared according to the invention comprises elementary polymer particles with a remarkably constant distribution.

Finally, the process for the preparation of, latices according to the invention makes possible the preparation of products having a particularly high level of properties:
- it makes possible the preparation of latices which have an extremely high mechanical stability (even if their dry matter content is greater than 50%)
- it makes possible the preparation of latices and resins which make possible the preparation of compositions and articles which have excellent properties, in particular a high thermal stability, a very slight initial coloration and a low rheology for the plastisols.

The terms used in the present document are explained below.

The term "total amount of a reactant" is understood to mean the sum of the amounts of this reactant introduced into the reactor, in whatever form and at whatever time. Mention may in particular be made, as examples of forms for introducing the reactants, of fine dispersions, seed latices, reactants as such and solutions.

The term "fine dispersion" is understood to denote a stable dispersion or emulsion of droplets of at least one monomer in at least one liquid dispersant.

The term "latex" is understood to denote a stable dispersion or an emulsion of elementary particles of at least one polymer in at least one liquid dispersant.

The term "water-soluble substance" is understood to denote a substance having, at ambient temperature, a solubility in water which is greater than its solubility in oils.

The term "oil-soluble substance" is understood to denote a substance having, at ambient temperature, a solubility in oils which is greater than its solubility in water.

Mention may be made, as examples of ethylenically unsaturated monomers, of vinyl esters, such as vinyl acetate, acrylic esters, such as n-butyl acrylate and 2-ethylhexyl acrylate, methacrylic esters, such as methyl methacrylate and n-butyl methacrylate, nitriles and acrylamides or methacrylamides, styrene monomers, such as styrene, and olefinic monomers, such as ethylene, propylene and butadiene.

The term "halogenated vinyl monomers" is understood to denote ethylenically unsaturated monomers comprising one or more identical or different halogen atoms and not comprising a heteroatom other than the halogen atom(s).

Mention may be made, as examples of halogenated vinyl monomers, of chlorine-comprising halogenated vinyl monomers and fluorine-comprising halogenated vinyl monomers, and other halogenated vinyl monomers, such as vinyl bromide.

Mention may be made, as examples of chlorine-comprising halogenated vinyl monomers, of vinyl chloride, vinylidene chloride, trichloroethylene, chloroprene and chlorotrifluoroethylene.

Mention may be made, as examples of fluorine-comprising halogenated vinyl monomers, of vinyl fluoride, vinylidene fluoride, trifluoroethylene, tetrafluoro-ethylene, hexafluoropropylene and chlorotrifluoro-ethylene.

The term "halogenated vinyl polymers" is understood to denote both homopolymers of halogenated vinyl monomers and the copolymers which these monomers form with one another or with other ethylenically unsaturated monomers, such as olefins, acrylic esters, methacrylic esters, acrylonitriles, methacrylonitriles, acrylamides and methacrylamides, and vinyl esters, such as vinyl acetate.

Mention may be made, as examples of halogenated vinyl polymers, of chlorine-comprising halogenated vinyl polymers and fluorine-comprising halogenated vinyl polymers, such as vinylidene fluoride, hexafluoro-propylene or chlorotrifluoroethylene polymers.

Mention may be made, as examples of chlorine-comprising halogenated vinyl polymers, of vinyl chloride, vinylidene chloride, chlorotrifluoroethylene and chloroprene polymers.

Mention may be made, as examples of oil-soluble initiators, of oil-soluble organic peroxides, oilsoluble diazo compounds and other oil-soluble initiators, such as dimethyldiphenylalkanes.

The oil-soluble organic peroxides can be classified according to the number of carbon atoms which they comprise. According to this classification, it is possible to distinguish: (a) oil-soluble organic peroxides comprising less than 10 carbon atoms and (b) oil-soluble organic peroxides comprising at least 10 carbon atoms.

Mention may be made, as examples of oil-soluble organic peroxides of class (a), of diethyl peroxydicarbonate ($C_6$) and diisopropyl peroxydicarbonate ($C_8$).

It is possible, among the oil-soluble organic peroxides of class (b), to distinguish: (b-1) oil-soluble organic peroxides comprising between 10 and 20 carbon atoms and (b-2) oil-soluble organic peroxides comprising at least 20 carbon atoms.

Mention may be made, as examples of oil-soluble organic peroxides of class (b-1), of dibenzoyl peroxide ($C_{14}$), tert-butyl perneodecanoate ($C_{14}$) and cumyl perneo-decanoate ($C_{19}$).

Mention may be made, as examples of oil-soluble organic peroxides of class (b-2), of oil-soluble diacyl peroxides comprising at least 20 carbon atoms, oil-soluble dialkyl peroxydicarbonates comprising at least 20 carbon atoms and other oil-soluble organic peroxides comprising at least 20 carbon atoms, such as 2,5-dimethylhexane 2,5-diperbenzoate.

Mention may be made, as examples of oil-soluble diacyl peroxides comprising at least 20 carbon atoms, of didecanoyl peroxide ($C_{20}$) and dilauroyl peroxide ($C_{24}$).

Mention may be made, as examples of dialkyl peroxydicarbonates comprising at least 20 carbon atoms, of dimyristyl peroxydicarbonate ($C_{30}$) and di(4-tert-butyl)cyclohexyl peroxydicarbonate ($C_{22}$).

The oil-soluble diazo compounds can also be classified in particular according to the number of carbon atoms which they comprise. According to this classification, it is possible to distiguish: (a) oil-soluble diazo compounds comprising less than 10 carbon atoms and (b) oil-soluble diazo compounds comprising at least 10 carbon atoms.

Mention may be made, as example of oil-soluble diazo compound of class (a), of 2,2'-azobisisobutyronitrile ($C_8$).

Mention may be made, as example of oil-soluble diazo compound of class (b), of azobis(2,4-dimethylvaleronitrile) ($C_{14}$).

Mention may be in particular made, as examples of water-soluble initiators, of water-soluble inorganic peroxides, water-soluble organic hydroperoxides, such as cumyl hydroperoxide or tert-butyl hydroperoxide, water-soluble organic peroxides, such as succinoyl peroxide, or water-soluble diazo compounds, such as ammonium 4,4'-azobis (4-cyanovalerate).

Mention nay be made, as examples of water-soluble inorganic peroxides, of hydrogen peroxide, water-soluble perborates and water-soluble persulphates.

Mention may be made, as examples of water-soluble persulphates, of sodium, ammonium and potassium persulphates.

Mention may be made, as example of ionic emulsifiers, of cationic emulsifiers, amphoteric emulsifiers and anionic emulsifiers.

Mention may be made, as examples of cationic emulsifiers, of primary amine hydrochlorides, which are optionally ethoxylated, and quaternary ammonium salts.

Mention may be made, as examples of anionic emulsifiers, of ethoxylated or non-ethoxylated sodium monoalkyl sulphosuccinates, ethoxylated or non-ethoxylated sodium or ammonium nonylphenyl phosphates, sodium sulphosuccinates, and emulsifiers from classes (I) to (V) defined below.

Mention may be made, as examples of alkyl sulphates (I), of ethoxylated or non-ethoxylated, ammonium or sodium, linear or branched $C_6$, $C_8$, $C_{10}$, $C_{12}$, $C_{14}$, $C_{16}$, and $C_{18}$ alkyl sulphates.

Mention may be made, as examples of alkyl sulphonates (II), of sodium primary or secondary alkyl sulphonates, such as Mersolat® H76 and Hostapur® SAS respectively.

Mention may be made, as examples of alkylaryl sulphonates (III), of sodium or ammonium tetrapropylbenzene, n-dodecylbenzene and ethoxylated nonylphenyl sulphonates.

Mention may be made, as examples of dialkyl sulphosuccinates (IV), of sodium di(2-ethylhexyl), diisodecyl and bistridecyl sulphosuccinates.

Mention may be made, as examples of alkyl carboxylates (V), of sodium, ammonium or potassium laurates, myristates, palmitates and stearates.

Mention may be made, as examples of nonionic emulsifiers, of the condensates of ethylene oxide with fatty acids or with fatty alcohols.

Mention may be made, as examples of mechanical stabilizers, of $C_6$–$C_{20}$ fatty alcohols, $C_6$–$C_{20}$ alkanes, diesters of saturated aliphatic α,ω-dicarboxylic acids, and phthalic acid diesters.

The term "peak suppressant" is understood to denote an agent which regulates the kinetics of polymerization. Mention may be made, as examples of peak suppressants, of butylated hydroxyanisole and butylated hydroxytoluene.

Mention may be made, as examples of chain-extending agents, of diallyl maleate and diallyl phthalate.

Mention may be made, as examples of transfer agents, of chloroform, trichlorofluoromethane and di($C_2$–$C_5$ alkyl) carbonates, the alkyls being linear or branched.

The examples which follow are intended to illustrate the invention without, however, limiting the scope thereof.

EXAMPLE 1

According to the Invention

Preparation of the seed latex (seed latex S). 129.8 kg of demineralized water, 70 cm$^3$ of a 5.4 g/l aqueous copper sulphate pentahydrate solution and 580 g of a 180 g/kg tetrapropylbenzene sulphonate solution were first of all introduced into a 300 l reactor equipped with a stirrer and a jacket. The reactor was closed and the stirrer was switched on. A vacuum was produced in the reactor.

95.0 kg of vinyl chloride were introduced into the reactor.

The contents of the reactor were brought to 51° C. Once this temperature was reached, 2.38 l of a 40.0 g/l aqueous ammonia solution were introduced into the reactor. Subsequently, 500 cm$^3$ of a 66.5 g/l aqueous ammonium persulphate solution were, introduced into the reactor (this point is conventionally denoted by "$t_0$").

During the polymerization, 7.34 kg of a 180 g/kg aqueous tetrapropylbenzene sulphonate solution were introduced into the reactor.

When a fall in pressure is detected, i.e., in the case which concerns us, at $t_0$+378 min, the contents of the reactor were brought to a higher temperature and a treatment for purification from residual vinyl chloride was carried out.

The latex was emptied from the reactor. The latex was filtered through a sieve with a mesh spacing of 1 mm. The latex was introduced into a storage tank. Finally, 25.0 l of demineralized water were added to the latex.

A sample of latex was withdrawn from the storage tank and the dry matter content thereof was measured by hydrometry: the dry matter content of the seed latex S was 34.1%.

The distribution of the elementary polymer particles of the seed latex was also determined by light diffraction by means of a Coulter® LS230 device: the distribution of the elementary polymer particles of the seed latex S was unimodal; the mean diameter of these elementary particles had a value of 105 nm.

Preparation of the fine dispersion (1st part) 50.6 kg of demineralized water were first of all introduced into a 300 l mixing autoclave equipped with a stirrer and a jacket. 3.96 kg of 170 g/kg aqueous tetrapropylbenzene sulphonate solution, 283.36 g of dilauroyl peroxide, 80.68 g of dimyristyl peroxydicarbonate and 0.948 g of butylated hydroxy-anisole were introduced into the mixing autoclave. The mixing autoclave was closed and the stirrer was switched on. A vacuum was subsequently produced in the mixing autoclave.

Charging the reactants to the reactor (1st part). 50.6 kg of demineralized water, 3.96 kg of a 170 g/kg aqueous tetrapropylbenzene sulphonate solution and 18.9 kg of the seed latex S (including approximately 6.4 kg of seeding polymer and 12.5 kg of water) were successively introduced into a 300 l reactor equipped with a stirrer and a jacket. The reactor was closed and the stirrer was switched on. A vacuum was subsequently produced in the reactor.

Preparation of the fine dispersion (2nd part). 46.0 kg of vinyl chloride were introduced into the mixing autoclave and vigorous stirring was maintained therein in order to form therein an "ordinary" homogeneous aqueous dispersion of droplets of vinyl chloride comprising the oil-soluble initiators and the peak suppressant.

Charging the reactants to the reactor (2nd part). 46.0 kg of vinyl chloride were introduced into the reactor.

Preparation of the fine dispersion (3rd part) and charging the reactants to the reactor (3rd part). A high-pressure homogenizer connecting the mixing autoclave to the reactor was brought into service. The homogenization pressure was adjusted. The contents of the mixing autoclave were transferred into the reactor via this homogenizer. The operating conditions of the homogenizer were such that, at the outlet of the latter, a fine aqueous dispersion of vinyl chloride droplets comprising the oil-soluble initiators and the peak suppressant was obtained.

Polymerization. The contents of the reactor were brought to 51° C. Once this temperature was reached, 1.25 l of a 32.7 g/l aqueous ammonia solution were introduced into the reactor.

During polymerization, 42.0 kg of vinyl chloride were introduced into the reactor.

Once the fall in pressure ($\Delta P=1$ bar) was detected, the time which had passed since $t_0$ was recorded and the contents of the reactor were brought to a higher temperature.

Finishing operations. A treatment for purification from residual vinyl chloride was carried out.

The latex was emptied and the reactor was cleaned out.

The wet deposit present inside the reactor, in particular on its walls and on the blades of the stirrer, was collected. After weighing, the wet deposit was dried in an oven. The dry deposit was weighed in its turn.

The latex was filtered through a sieve with a mesh spacing of 1 mm. The wet lumps rejected on this sieve were collected. After weighing, the wet lumps were dried in an oven. The dry lumps were weighed in their turn.

A sample of latex was withdrawn and the dry matter content thereof was measured by hydrometry and the distribution of the elementary particles thereof was measured by sedimentometry.

Drying the latex and recovery of the resin. The balance of the latex was dried by atomization. The dry resin formed from vinyl chloride polymer was recovered and was milled. Finally, the K number of the polymer was measured according to ISO Standard 1628-2.

Results of the determinations. The duration of the polymerization from $t_0$ to $\Delta P=1$ bar was 363 min.

The amount of wet deposit which was collected inside the reactor had a value of 2.82 kg. The amount of dry deposit had a value of 0.76 kg.

The amount of wet lumps had a value of 3.6 kg. The amount of dry lumps had a value of 1.95 kg.

The dry matter content of the latex had a value of 50.6%.

The distribution of the elementary particles of the polymer of the latex was as follows: bimodal distribution comprising;
- approximately 83% by weight of a family of "large" elementary particles with a broad distribution with a weight-average diameter of approximately 0.83 μm
- approximately 17% by weight of a family of "fine" elementary particles with a relatively narrow distribution with a weight-average diameter of approximately 0.16 μm.

The K number of the vinyl chloride polymer had a value of 72.2.

EXAMPLE 2

Comparative Example

The procedure was as in Example 1, except that;
seed latex was not introduced into the reactor
the amounts of demineralized water which were introduced into the mixing autoclave, on the one hand, and into the reactor, on the other hand, each had a value of 56.8 kg
the amount of vinyl chloride which was introduced into the reactor during polymerization had a value of 48.6 kg.

The amounts of demineralized water and of vinyl chloride were corrected with respect to Example 1, so that the maximum accessible dry matter content (corresponding to a theoretical degree of conversion of 100%) was identical for the 2 tests presented as examples.

Progression of the test and results of the determinations. The duration of the polymerization from $t_0$ to $\Delta P=1$ bar was 402 min.

The amount of wet deposit collected inside the reactor had a value of 5.80 kg. The amount of the dry deposit had a value of 1.19 kg.

The latex was partially coagulated: it comprised ani extremely high amount of lumps (greater than 20 kg), which lumps blocked the filter. The filtration had to be halted; the luips could be quantified more accurately. The latex could not be dried by means of an atomizer-dryer.

The distribution of the elementary particles of the latex (which was measured on a sample filtered beforehand) was unimodal: it comprised a family of "large" elementary particles with a broad distribution with a weight-average diameter of approximately 0.85 μm.

The K number of the vinyl chloride polymer (prepared by drying a sample of latex in an oven) had a value of 71.9.

The invention claimed is:

1. A process for the preparation of latices by seeded batchwise radical microsuspension polymerization of one or more monomers, comprising polymerizing:
   (a) one or more fine dispersions comprising one or more finely dispersed monomers, at least one of said fine dispersions comprising one or more oil-soluble initiators, and
   (b) one or more seed latices comprising one or more seeding polymers.

2. The process for the preparation of latices according to claim 1, wherein at most one seed latex comprises one or more oil-soluble initiators.

3. The process for the preparation of latices according to claim 1, wherein at least 50% by weight of the monomers are chosen from halogenated vinyl monomers.

4. The process for the preparation of latices according to claim 1, wherein the weight of the finely dispersed monomer or monomers with respect to the total weight of the monomer or monomers has a value of at least 1%.

5. The process for the preparation of latices according to claim 1, wherein at least 50% by weight of the seeding polymers comprise at least one halogenated vinyl polymer.

6. The process for the preparation of latices according to claim 1, wherein the seeding polymer or polymers have a distribution of their elementary particles such that at least 50% by weight of the elementary particles have a diameter of less than 400 nm.

7. The process for the preparation of latices according to claim 1, wherein the weight of the seeding polymer or polymers with respect to the total weight of the monomer or monomers has a value of at least 1%.

8. The process for the preparation of latices according to claim 1, wherein the weight of the seeding polymer or polymers with respect to the total weight of the monomer or monomers has a value of at most 25%.

9. The process for the preparation of latices according to claim 1, wherein, after the polymerization, the latices are treated so as to recover therefrom the polymer or polymers in the form of resins.

10. The process for the preparation of latices according to claim 9, wherein, after the recovery of the polymer or polymers in the form of resins, these resins are treated so as to adjust the particle size thereof.

11. The process for the preparation of latices according to claim 1, wherein one or more fine dispersions comprise, in addition and independently of one another, one or more mechanical stabilizers.

12. The process for the preparation of latices according to claim 1, wherein one or more seed latices comprise, in addition and independently of one another, one or more mechanical stabilizers.

13. The process for the preparation of latices according to claim 1, further comprising, in the polymerization, one or more substances, and/or one or more solutions of one or more substances, and/or one or more dispersions of one or more substances, wherein the one or more substances comprise one or more mechanical stabilizers.

14. The process for the preparation of latices according to claim 11, wherein the mechanical stabilizers are diesters of saturated aliphatic α,ω-dicarboxylic acids.

15. The process for the preparation of latices according to claim 12, wherein the mechanical stabilizers are diesters of saturated aliphatic α,ω-dicarboxylic acids.

16. The process for the preparation of latices according to claim 13, wherein the mechanical stabilizers are diesters of saturated aliphatic α,ω-dicarboxylic acids.

17. A process for the preparation of polymer compositions, which comprises using a polymer resin prepared by the process according to claim 9.

18. A process for the preparation of polymer compositions, which comprises using a polymer resin prepared by the process according to claim 10.

19. The process according to claim 17, wherein the polymer resin is a vinyl chloride polymer comprising at least 80% by weight of —$CH_2$—CHCl—units and the polymer composition is a plastisol composition.

20. The process according to claim 18, wherein the polymer resin is a vinyl chloride polymer comprising at least 80% by weight of —$CH_2$—CHCl—units and the polymer composition is a plastisol composition.

21. The process as claimed in claim 1, wherein said one or more fine dispersions comprising one or more finely dispersed monomers has/have a distribution of droplets of from a few hundredths of a micron to a few microns.

22. The process as claimed in claim 1, wherein said one or more fine dispersions comprising one or more finely dispersed monomers has/have a distribution of droplets of from a few tenths of a micron to a few microns.

23. The process as claimed in 1, wherein said one or more fine dispersions is/are prepared by a high-pressure homogenizer.

* * * * *